Patented Oct. 21, 1941

2,260,126

UNITED STATES PATENT OFFICE 2,260,126

BUTYL ALCOHOL FERMENTATION PROCESS

Noble R. Tarvin, Brazil, Ind., assignor to Commercial Solvents Corporation, Terre Haute, Ind., a corporation of Maryland No Drawing. Application June 28, 1940,
Serial No. 342,909

11 Claims. (Cl. 195—44)

My invention relates to the production of butyl alcohol by fermentation, and more particularly to an improved process for the production of butyl alcohol, acetone, and other products by the fermentation of carbohydrate mashes.

The early commercial production of butyl alcohol by fermentation was effected by fermenting starch mashes by means of bacteria of the type *Clostridium acetobutylicum* (Weizmann). This process was responsible for the production of large amounts of butyl alcohol, acetone, and ethyl alcohol but was seriously limited, both as to the source of carbohydrate and as to the ratio of products obtainable. Subsequently, a new group of butyl alcohol producing bacteria has been discovered comprising a number of types of bacteria which are capable of fermenting soluble carbohydrate mashes, and among which different individual strains of bacteria are found which produce different ratios of neutral products. This group of bacteria may be defined as those capable of producing consistently higher yields of solvents from nutrient glucose mashes than from mashes consisting solely of grain meal and water, and which produce increasing amounts of acidic end products throughout the fermentation in the absence of hydrogen ion control. Various cultures of bacteria belonging to this group produce ratios of butyl alcohol ranging from 55% to 74% by weight of the total solvents, and acetone in proportions ranging from less than 5% to over 40% by weight of the total solvents. Although it has thus been possible to utilize different cultures of bacteria for the production of different ratios of solvents, it has not, up to the present time, been possible to vary to any substantial extent the solvent ratio produced by any particular culture of butyl alcohol producing bacteria. Such a procedure would obviously be advantageous from the standpoint of controlling the ratio of products produced in a fermentation plant without the necessity for changing the bacteria employed. In accordance with such a procedure a strain of bacteria giving a very high total yield of solvents could be utilized continuously without the necessity for substituting lower yielding strains to produce the desired ratio of products.

I have now found that when employing bacteria of the group referred to above, a very substantial change in the ratio of neutral products may be secured by providing in the fermenting mash a non-toxic nitrate, such as sodium, potassium, or ammonium nitrate. By incorporating a nitric acid salt in the fermenting mash the proportion of acetone in the products is very substantially increased, and by varying the proportion of nitrate in the mash the ratio of products secured may be directly controlled.

My invention is applicable to fermentations effected with any butyl alcohol producing bacteria of the group previously defined, i. e., those which are capable of producing consistently higher yields of neutral end products from nutrient glucose mashes than from mashes consisting solely of grain meal and water, and which produce increasing amounts of acidic end products throughout the fermentation in the absence of hydrogen ion control. Among the numerous bacteria of this type may be mentioned the bacteria of the group *Clostridium saccharo-acetobutylicum*, described in United States Patent No. 2,089,522 of Woodruff et al.; the bacteria of the group *Clostridium inverto-acetobutylicum*, described in United States Patent No. 2,089,562 of Legg et al; *Clostridium saccharo-acetobutylicum-beta* and *Clostridium saccharo-acetobutylicum-gamma*, described in United States Patent No. 2,050,219 of Arzberger; the bacteria of the group *Clostridium propyl butylicum*, described in United States Patent No. 2,132,039 of Muller; the bacteria of the group *Clostridium saccharo-butyl-acetonicum-liquefaciens*, described in United States Patent No. 2,139,108 of Arzberger; and *Clostridium saccharo-butyl-acetonicum-liquefaciens-gamma* and *Clostridium saccharo-butyl-acetonicum-liquefaciens-delta*, described in United States Patent No. 2,139,111 of Carnarius et al.

In carrying out my invention the nitric acid salt may merely be incorporated in the initial mash in a suitable concentration or may be added to the mash during the fermentation. Any non-toxic nitrate may be utilized, and among these may be mentioned sodium nitrate, potassium nitrate, calcium nitrate, magnesium nitrate, and ammonium nitrate. The nitrates may be employed in any concentration less than that having an inhibitory effect upon the fermentation, but for most purposes from 1% to 15% based on the weight of the carbohydrate in the mash will be found to be satisfactory. The nitrates may be added in addition to other forms of nitrogen provided in the mash, or in the case of bacteria capable of assimilating nitrate nitrogen the nitrates may merely be substituted for the other forms of assimilable nitrogen. With the exception of providing the nitrates in the mash, as set forth above, the fermentations may be carried out in exactly the same manner previously employed when utilizing bacteria of this group. Fermentation mashes otherwise identical in composition with those previously employed may be utilized, and the same fermentation conditions, i. e., temperature, pH control, etc., may be employed.

Among the fermentation conditions which it has previously been found to be essential to control for satisfactory results with this group of bacteria, is the hydrogen ion concentration of the fermenting mash. For this purpose it has been found to be necessary to supply an alkaline neutralizing agent during fermentation to control the acidity such that the final pH secured by the action of the bacteria falls within the range 5.0–6.5. To effect this end free ammonia has been employed to control the acidity as well as to supply nitrogen for the bacteria, or other alkaline materials have been introduced into the mash when ammonium salts or degraded protein was employed as the source of nitrogen. I have found that when employing nitrates as a source of assimilable nitrogen, it is desirable to provide such alkaline neutralizing agents or buffers in the fermenting mash but that it is unnecessary to do so. In the absence of such materials satisfactory fermentations are secured, but the time of fermentation tends to be longer, and the increase in acetone ratio in the products secured by the use of the nitrates tends to be less than obtainable when employing alkaline neutralizing agents or buffers in addition to the nitrates. For this reason there is suitably incorporated in the initial mash from 0.1% to 10.0%, preferably 0.1% to 1.0%, of calcium carbonate or other insoluble neutralizing agent based on the weight of the carbohydrate. Similarly, an equivalent amount of an alkaline buffer such as a dibasic alkali metal phosphate may be employed, or there may be introduced into the fermenting mash during the active stage of the fermentation an equivalent amount of a soluble alkaline neutralizing agent.

My invention may now be illustrated by the following specific examples:

Example I

A mash containing 70 grams of sugar, calculated as sucrose, in the form of cane molasses, 0.22 gram of superphosphate ($CaH_4(PO_4)_2$) and 3.8 grams of precipitated calcium carbonate per liter of mash was prepared and divided into three portions. Ammonium sulfate and sodium nitrate were added to these portions as indicated in the table below. The completed mashes were sterilized for 20 minutes at 20 pounds pressure, cooled and inoculated with 4% by volume of an active culture of the *Clostridium saccharo-butyl-acetonicum-liquefaciens* group. The following results were obtained:

| No. | $(NH_4)_2SO_4$ | $NaNO_3$ | Fermentation time | Sugar to solvents | Acetone ratio, percent of total solvents, by weight |
|---|---|---|---|---|---|
| | Gms./liter | Gms./liter | Hours | Percent | |
| I | 3.5 | | 48 | 32.1 | 27.7 |
| II | 1.9 | 2.1 | 40 | 31.3 | 36.0 |
| III | | 4.3 | 40 | 29.6 | 43.0 |

Example II

A mash containing 62.5 grams of sugar, calculated as sucrose, in the form of cane molasses, 0.33 gram of superphosphate ($CaH_4(PO_4)_2$) and 3.8 grams of precipitated calcium carbonate per liter of mash was prepared and divided into two portions. Ammonium sulfate and sodium nitrate were added to these portions as indicated in the table below. The completed mashes were sterilized, cooled and inoculated with 4% by volume of an active culture of *Clostridium saccharo-acetobutylicum-alpha*. The following results were obtained:

| No. | $(NH_4)_2SO_4$ | $NaNO_3$ | Fermentation time | Sugar to solvents | Acetone ratio per cent of total solvents, by weight |
|---|---|---|---|---|---|
| | Gms./liter | Gms./liter | Hours | Per cent | |
| I | 3.3 | | 40 | 27.9 | 28.4 |
| II | 3.3 | 4.0 | 40 | 31.9 | 33.6 |

Example III

A mash containing 70 grams of sugar, calculated as sucrose, in the form of cane molasses, 0.22 gram of superphosphate ($CaH_4(PO_4)_2$) and 3.8 grams of precipitated calcium carbonate per liter of mash was prepared and divided into two portions. Ammonium sulfate and sodium nitrate were added to these portions as indicated in the table below. The completed mashes were sterilized, cooled and inoculated with 4% by volume of an active culture of *Clostridium saccharo-butyl-acetonicum-liquefaciens-gamma*. The following results were obtained:

| No. | $(NH_4)_2SO_4$ | $NaNO_3$ | Fermentation time | Sugar to solvents | Acetone ratio per cent of total solvents, by weight |
|---|---|---|---|---|---|
| | Gms./liter | Gms./liter | Hours | Per cent | |
| I | 3.5 | | 40 | 30.3 | 30.7 |
| II | | 4.5 | 40 | 29.6 | 40.9 |

Example IV

A mash containing 70 grams of sugar, calculated as sucrose, in the form of cane molasses, 0.22 gram of superphosphate ($CaH_4(PO_4)_2$) and 3.8 grams of precipitated calcium carbonate per liter of mash was prepared and divided into two portions. Ammonium sulfate and sodium nitrate were added to these portions as indicated in the table below. The completed mashes were sterilized, cooled and inoculated with 4% by volume of an active culture of *Clostridium saccharo-butyl-acetonicum-liquefaciens-delta*. The following results were obtained:

| No. | $(NH_4)_2SO_4$ | $NaNO_3$ | Fermentation time | Sugar to solvents | Acetone ratio per cent of total solvents, by weight |
|---|---|---|---|---|---|
| | Gms./liter | Gms./liter | Hours | Per cent | |
| I | 3.5 | | 40 | 30.0 | 27.9 |
| II | | 4.5 | 40 | 29.6 | 33.6 |

Example V

A molasses mash containing 70 grams of sucrose, .22 gram of superphosphate and 3.8 grams of precipitated calcium carbonate per liter of mash was prepared and divided into several portions as in Example I. Varying amounts of ammonium sulfate and sodium nitrate were added to each portion. These were then sterilized and inoculated as in Example I with the following results:

| No. | $(NH_4)_2SO_4$ | $NaNO_3$ | Fermentation time | Sugar to solvents | Acetone ratio per cent of total solvents, by weight |
|---|---|---|---|---|---|
| | Gms./liter | Gms./liter | Hours | Per cent | |
| I | | 4.6 | 40 | 28.1 | 44.4 |
| II | .35 | 4.0 | 40 | 27.9 | 46.4 |
| III | .88 | 3.8 | 40 | 29.9 | 41.5 |
| IV | 1.8 | 2.2 | 40 | 30.3 | 38.9 |
| V | 2.6 | 1.1 | 40 | 32.0 | |
| VI | 3.1 | .44 | 40 | 31.7 | 33.7 |
| VII | 3.5 | 0 | 40 | 32.2 | 29.3 |

*Example VI*

A molasses mash was prepared as in Example I containing 70 grams of sucrose, 0.22 gram of superphosphate and 4.6 grams of sodium nitrate per liter of mash. Varying amounts of $CaCO_3$ were added to several portions of this mash which were fermented as in Example I with the following results:

| No. | $CaCO_3$ | Fermentation time | Sugar to solvents | Acetone ratio per cent of total solvents by weight |
|---|---|---|---|---|
| | Gms./liter | Hours | Per cent | |
| I | | 64 | 31.1 | 36.4 |
| II | .13 | 46 | 32.3 | 38.5 |
| III | .63 | 40 | 28.4 | 46.7 |

*Example VII*

In order to illustrate the effect of an alkaline buffer other than calcium carbonate a mash was prepared as in Example VI containing nitrate and superphosphate. Different portions were fermented without any buffer, with calcium carbonate, and with different amounts of di-potassium phosphate. The following results were secured:

| No. | $CaCO_3$ | $K_2HPO_4$ | Fermentation time | Sugar to solvents | Acetone ratio per cent of total solvents, by weight |
|---|---|---|---|---|---|
| | Gms./liter | Gms./liter | Hours | Per cent | |
| I | | | 64 | 31.1 | 36.4 |
| II | .63 | | 40 | 28.8 | 42.0 |
| III | | .31 | 40 | 28.1 | 42.3 |
| IV | | .63 | 42 | 28.4 | 41.8 |

It is to be understood, of course, that my invention is not to be construed as limited by the above examples. These examples are illustrative only and various modifications of procedure may, of course, be employed. As has previously been pointed out, the fermentations may be effected in any manner previously employed for this group of bacteria, with the exception of providing the non-toxic nitrates in the fermenting mash. Any of the usual carbohydrates or other ingredients of mashes for such fermentations may be employed, and any of the common fermentation conditions or procedures may be utilized. Alkaline buffers other than those specifically designated in the examples may be used, and by the term alkaline buffer as used in this connection is meant any of the common alkaline reacting buffering materials or neutralizing agents which are employed in fermentations of this nature to control the acidity of the mash during the fermentation. In general, it may be said that any modifications of procedure or the use of any equivalents which would normally occur to one skilled in the art are included in the scope of my invention.

My invention now having been described, what I claim is:

1. In a process for the production of normal-butyl alcohol and acetone by the fermentation of a carbohydrate mash by means of butyl alcohol producing bacteria of the type which are capable of producing consistently higher yields of neutral end products from nutrient glucose mashes than from mashes consisting solely of grain meal and water, and which produce increasing amounts of acidic end products throughout the fermentation in the absence of hydrogen ion control, the improvement which comprises controlling the ratio of neutral products by providing in the fermenting mash a non-toxic nitrate.

2. In a process for the production of normal-butyl alcohol and acetone by the fermentation of a carbohydrate mash by means of butyl alcohol producing bacteria of the type which are capable of producing consistently higher yields of neutral end products from nutrient glucose mashes than from mashes consisting solely of grain meal and water, and which produce increasing amounts of acidic end products throughout the fermentation in the absence of hydrogen ion control, the improvement which comprises controlling the ratio of neutral products by providing in the fermenting mash a nitrate chosen from the group consisting of the ammonium, alkali metal, and alkaline earth metal salts of nitric acid.

3. In a process for the production of normal-butyl alcohol and acetone by the fermentation of a carbohydrate mash by means of butyl alcohol producing bacteria of the type which are capable of producing consistently higher yields of neutral end products from nutrient glucose mashes than from mashes consisting solely of grain meal and water, and which produce increasing amounts of acidic end products throughout the fermentation in the absence of hydrogen ion control, the improvement which comprises controlling the ratio of neutral products by providing in the fermenting mash from 1% to 15% of sodium nitrate, based on the weight of the carbohydrate in the mash.

4. In a process for the production of normal-butyl alcohol and acetone by the fermentation of a carbohydrate mash by means of butyl alcohol producing bacteria of the type which are capable of producing consistently higher yields of neutral end products from nutrient glucose mashes than from mashes consisting solely of grain meal and water, and which produce increasing amounts of acidic end products throughout the fermentation in the absence of hydrogen ion control, the improvement which comprises controlling the ratio of neutral products by providing in the fermenting mash a non-toxic nitrate and an alkaline buffering material.

5. In a process for the production of normal-butyl alcohol and acetone by the fermentation of a carbohydrate mash by means of butyl alcohol producing bacteria of the type which are capable of producing consistently higher yields of neutral end products from nutrient glucose mashes than from mashes consisting solely of grain meal and water, and which produce increasing amounts of acidic end products throughout the fermentation in the absence of hydrogen ion control, the improvement which comprises controlling the ratio of neutral products by providing in the fermenting mash from 1% to 15% of sodium nitrate and from 0.1% to 10.0% of calcium carbonate, based on the weight of the carbohydrate in the mash.

6. In a process for the production of normal-butyl alcohol and acetone by the fermentation of a carbohydrate mash by means of bacteria of the group *Clostridium saccharo-acetobutylicum*, the improvement which comprises providing in the fermenting mash a non-toxic nitrate.

7. In a process for the production of normal-butyl alcohol and acetone by the fermentation of a carbohydrate mash by means of bacteria of the group *Clostridium saccharo-acetobutylicum*, the improvement which comprises providing in the fermenting mash a non-toxic nitrate and an alkaline buffering material.

8. In a process for the production of normal-butyl alcohol and acetone by the fermentation of a carbohydrate mash by means of bacteria of the group *Clostridium saccharo-acetobutylicum*, the improvement which comprising providing in the fermenting mash from 1% to 15% of sodium nitrate and from 0.1% to 1.0% of calcium carbonate, based on the weight of the carbohydrate in the mash.

9. In a process for the production of normal-butyl alcohol, acetone, and ethyl alcohol by the fermentation of a carbohydrate mash by means of bacteria of the group *Clostridium saccharo-butyl-acetonicum-liquefaciens*, the improvement which comprises providing at least a portion of the assimilable nitrogen in the mash in the form of a non-toxic nitrate.

10. In a process for the production of normal-butyl alcohol, acetone, and ethyl alcohol by the fermentation of a carbohydrate mash by means of bacteria of the group *Clostridium saccharo-butyl-acetonicum-liquefaciens*, the improvement which comprises providing at least a portion of the assimilable nitrogen in the mash in the form of a non-toxic nitrate, and providing an alkaline buffering material in the fermenting mash.

11. In a process for the production of normal-butyl alcohol, acetone, and ethyl alcohol by the fermentation of a carbohydrate mash by means of bacteria of the group *Clostridium saccharo-butyl-acetonicum-liquefaciens*, the improvement which comprises providing at least a portion of the assimilable nitrogen in the mash in the form of from 1% to 15% of sodium nitrate, based on the weight of the sugar in the mash, and providing in the mash from 0.1% to 1.0% of calcium carbonate, based on the weight of the carbohydrate in the mash.

NOBLE R. TARVIN.